Dec. 24, 1957 P. M. FIELD 2,817,268
ADJUSTABLE PLATFORM FOR OPAQUE COPY AND PICTURE PROJECTOR
Filed Feb. 15, 1956 2 Sheets-Sheet 2
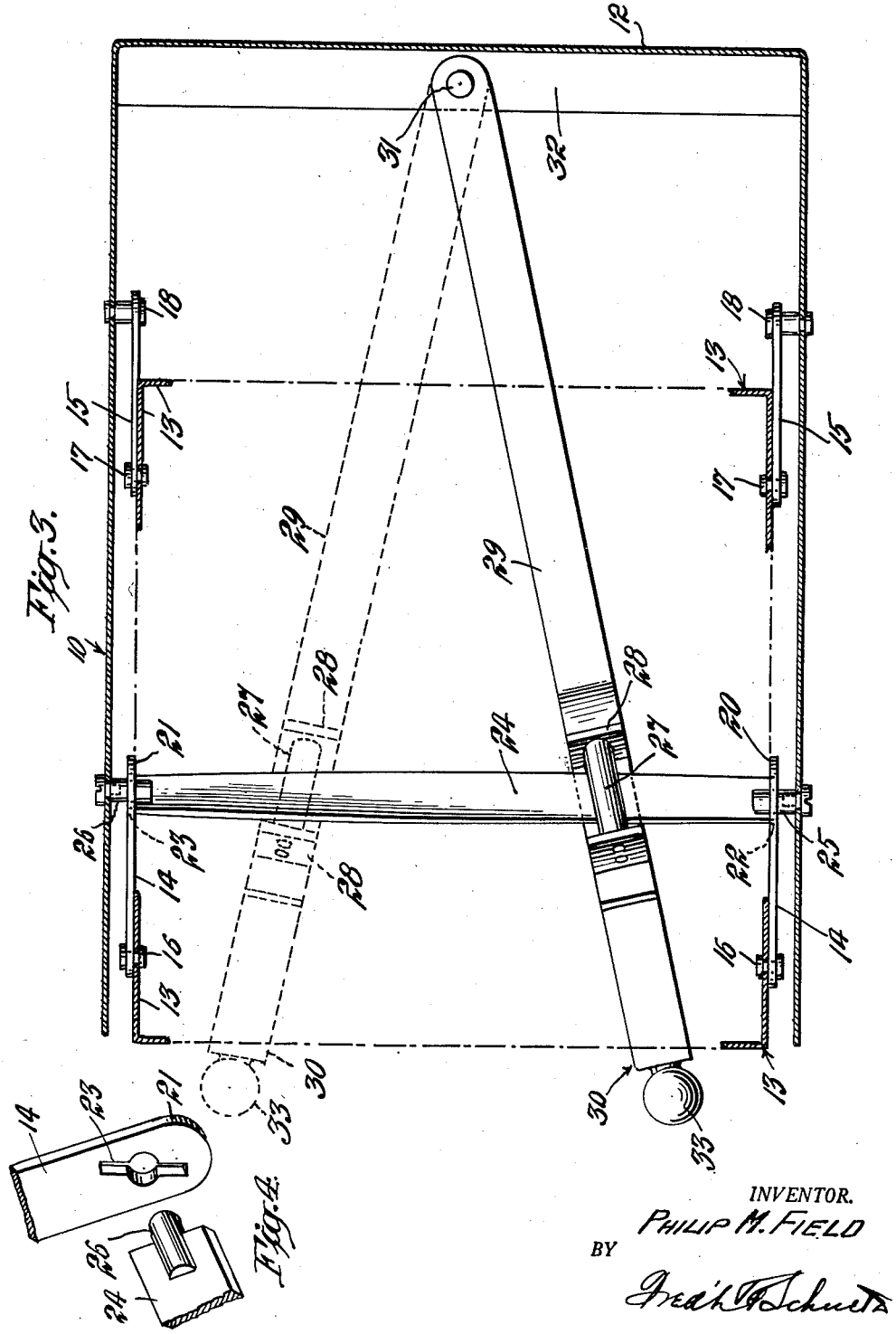
INVENTOR.
PHILIP M. FIELD
BY

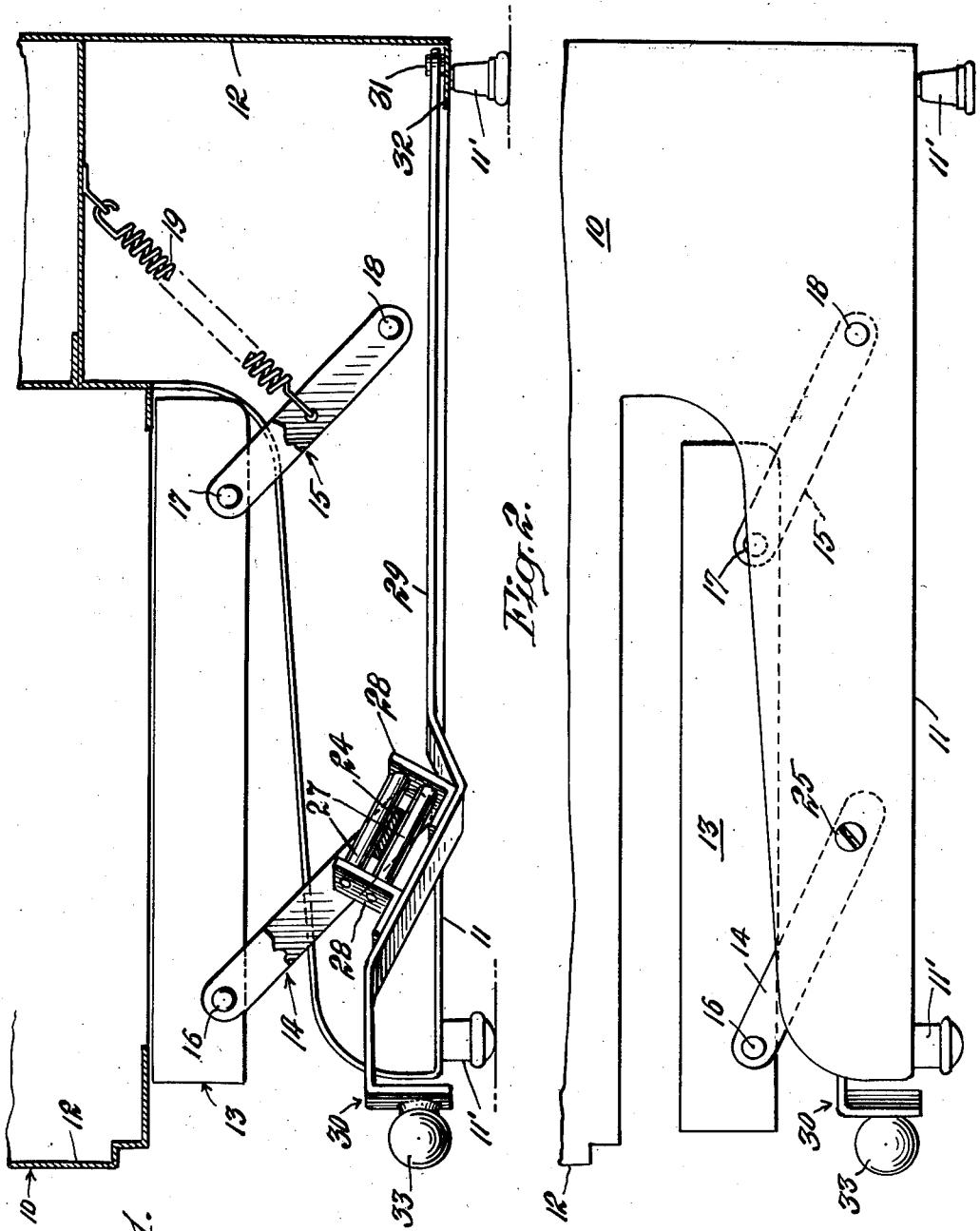

United States Patent Office 2,817,268
Patented Dec. 24, 1957

2,817,268

ADJUSTABLE PLATFORM FOR OPAQUE COPY AND PICTURE PROJECTOR

Philip M. Field, Maplewood, N. J., assignor to Charles Beseler Company, East Orange, N. J., a partnership Application February 15, 1956, Serial No. 565,593

6 Claims. (Cl. 88—26)

The invention relates to projector apparatus designed more especially for the projection of opaque copy such as photographs, post cards, pages of a book or magazine, as well as three-dimensional objects.

In an earlier U. S. Patent No. 2,463,026 granted to me, I have disclosed means for mounting adjustably, in projector apparatus of the aforesaid nature, a platform which is adapted to receive for projection said opaque copy. The adjustment (vertical) provided therein was effected manually in successive steps, latching means being provided to this end to retain the copy-holding platform member temporarily in a selected location. While such an arrangement is generally satisfactory, it is to be noted, however, that, in shifting the platform from one plane location to another, the toothed displacement arrangement necessarily does not admit of fine adjustment. It involves, moreover, more or less abrupt transitions and, at times, develops objectionable noises.

It is an object of the present invention to overcome these objections as by eliminating the toothed arrangement entirely; and to provide for a continuous smooth transition of a platform from one plane to another, so that most minute and precise adjustments to accommodate different thicknesses of copy—within the chosen range—to the focal plane are possible and are maintained positively in a simple and expeditious manner.

A further object of the invention is to dispense, other than for counterbalancing purposes, with the use of springs or other resilient means to effect and maintain an adjustment of the platform.

In carrying out the invention, there is provided in the bottom of the projector housing the conventional, or a special type, platform for receiving the copy to be projected, a novel mounting for said platform, however, being provided whereby a smooth transition thereof from one plane to another is effected by moving an actuating handle—most minute adjustments being possible therewith. This is attained by pivotally attaching the platform to the upper ends of two pairs of link members, one set being mounted also pivotally with respect to the base of the housing, while the other set is fixed to rotate with a helically twisted, rotatable bar in a manner such that when the bar is rotated about an axis parallel to the plane of the platform by interaction of a novel handle unit with the bar, the said platform is displaced in parallel planes vertically through operation manually of the handle unit accordingly.

The nature of the invention, however, will best be understood when described in connection with the accompanying drawings, in which:

Fig. 1 is a fragmentary view, in vertical section, of the lower portion of the projector with platform thereof shown in its uppermost position.

Fig. 2 is a fragmentary side elevation of the projector apparatus, showing the platform adjusted to its lowermost position.

Fig. 3 is a horizontal section, taken on the line 3—3, Fig. 1, and looking in the direction of the arrows.

Fig. 4 is a view in isometric projection, and on an enlarged scale, illustrating the manner of rotatably mounting the twisted bar and of securing the said other set of link members thereto.

Referring to the drawings, 10 designates the frame and housing of the projector apparatus including the bottom 11 and the front wall 12 of said housing, the bottom being provided with feet 11' for support of the projector. The conventional platform 13 is mounted in the housing in a novel manner as by means of two pairs of links 14 and 15, the upper ends of both pairs being pivotally attached to the platform respectively along its sides 16, 17. Only one of the pairs, however, is thus secured at its lower end, as at 18. A spring 19 may be connected with the set of links 15 to counterbalance the mass of the platform and associated elements.

While the free ends of the two links of the other pair 14 are also to be pivotally secured, it is to be noted that, in accordance with the invention, the attachment is effected in a novel manner and is indirect. Thus, as is shown more particularly in Fig. 4, the respective lower ends 20, 21 of the link pair 14 are slotted to fit over and preferably be sealed, respectively, to the corresponding ends of a bar 24, the slots 22 and 23 being angularly displaced with respect to each other to an extent determined by the desired travel of the platform. This travel is effected by rocking the bar on its cylindrical ends or trunnions 25, 26 journaled in the corresponding side walls of the housing for rotation of the bar, as hereinafter set forth.

To this end, the said bar, moreover, is helically twisted along its length between the journaled portions and passes loosely between antifriction means, such as the pair of parallel rollers 27 which engage the same, the clearance between the rollers being sufficient to provide the space required to accommodate the helical bar in those positions where the rollers cross the bar at angles other than 90°. These rollers are carried by a bracket 28 secured rigidly to the top surface of a handle member 29 forming with the bracket an operating unit 30. The said handle member is, for simplicity of construction, preferably pivoted at its one end 31 to an inturned flange 32 of the housing, and extends then through the lower portion of the housing beneath the platform to the outside of said housing for manual oscillation thereat in effecting the desired displacement of the platform. However, if the handle member be mounted for translation along the bar, the clearance aforesaid is not required.

The angular movement of the handle member is in substantially a plane parallel to the said platform; and in thus shifting the engagement of the rollers along the helically twisted bar 24, the latter is rotated and with it the pair of links 14. For example, in lowering the platform from the position indicated in full lines, Fig. 1 of the drawings, to the lowermost position indicated in Fig. 2, the handle member by manipulation of the knob 33 attached to its outer end will be moved from the full-line position to the broken-line position, and vice versa. This is accomplished by the interaction of bar 24 with rollers 27 to rotate the former and angularly move thereby the pair of links 14 which are fixed to the outer ends of the said bar. By this expedient, small increments of vertical adjustment of the position of the platform to intermediate positions are obtainable by substantial movement of the knob 33, which adjustment will be positively maintained under relatively heavy loading of the platform.

I claim:

1. In an opaque-copy projector apparatus having a vertically adjustable copy-supporting platform: means for lowering from and returning to the projection field the said platform, comprising: two end pairs of links pivoted at their one ends to the respective sides of the platform parallel to each other to rock about axes parallel to said platform, the free ends of one of the pairs of links being pivoted to the projector housing below the platform; an operating unit pivoted at the bottom of the housing for angular movement in a plane parallel to the platform, and continuing across the bottom of the housing with its opposite end extending beyond the same to afford a manipulating means for adjustment of the platform, and a pair of separated antifriction means supported on the operating unit; and a helically twisted bar extending between the antifriction means for engagement therewith and rotatably supported at its opposite ends by the housing, and the respective free ends of the other pair of links being fixed respectively to said bar at its opposite ends for rocking of these links, accordingly as the bar is turned by the angular travel of said manipulating means to effect thereby adjustment of the platform to the desired vertical plane.

2. The opaque-copy projector apparatus according to claim 1, wherein the antifriction means consists of a pair of parallel, separated rollers, together with a bracket rotatably carrying the same and fixed to the manipulating means.

3. The opaque-copy projector apparatus according to claim 1, wherein the helically twisted bar at its opposite ends extends into slots in the free lower ends of the said other pair of links.

4. The opaque-copy projector apparatus according to claim 1, wherein the helically twisted bar terminates in respective trunnions coaxially with the bar.

5. The opaque-copy projector apparatus according to claim 1, wherein counterbalancing springs are connected to the first-named end pair of links.

6. For use in an opaque-copy projector apparatus having a vertically adjustable platform for copy: an actuating member for adjusting said platform consisting of a helically twisted bar provided with a cylindrical supporting trunnion at its respective ends and adapted adjacently the trunnions to receive the respective ends of one pair of links of a parallelogram support for the platform together with an operating lever supported for angular movement in a horizontal plane below the bar; and means carried by the lever engageable with the bar to rotate the same in opposite directions accordingly as said operating lever is manipulated in its plane.

References Cited in the file of this patent

UNITED STATES PATENTS

| | | |
|---|---|---|
| 2,504,386 | Brady | Apr. 18, 1950 |
| 2,578,106 | Taylor | Dec. 11, 1951 |